3,520,141
IMPERMEABILIZATION OF SOIL TO WATER
Willis G. Routson, Walnut Creek, Calif., assignor to The
Dow Chemical Company, Midland, Mich., a corporation of Delaware
No Drawing. Filed Sept. 18, 1968, Ser. No. 760,669
Int. Cl. E02b 1/00
U.S. Cl. 61—1                                      7 Claims

ABSTRACT OF THE DISCLOSURE

Polyvalent metal ions and certain polymers are eluted sequentially into soil to produce a water-impermeable layer some distance below the surface of the soil. Preferred metal ions are provided in the form of metal salts which dissolve in water to yield di- and trivalent ions. Useful polymers include water-soluble anionic and nonionic polymers and solid polymers in the form of water emulsions.

---

Soil sealing, as practiced for conserving water in ponds and canals, generally involves plugging the porosity of the soil with water impermeable compositions. Numerous techniques have been proposed including the application of various emulsions of water impermeable materials and polymerizing reactants which produce water impermeabilization in situ. In the latter connection, it is known for instance to impregnate soil with various monomer systems which are polymerized in situ to yield a water impermeable cohered mass.

It would be desirable, and it is a principal object of the instant invention, to provide a novel method for rendering soils impermeable to the passage of water by surface treatment of the soil. Particularly, it is desirable to provide a method which achieves localized subsurface impermeabilization for the conservation of impermeabilizing materials and yet accommodate a method of application involving simply treating the surface of the soil. The above, and other benefits as will become apparent hereinafter, are objects of the instant invention.

In accordance with this invention, soils are rendered less permeable to the passage of water by the application in sequence of polyvalent metal ions and certain polymers including anionic and nonioic water-soluble polymers and solid polymers in aqueous dispersion. The ions are washed or eluted to a subsurface level within the soil and then the soil is treated with a liquid dispersion of the polymer. As the polymer is carried deeper into the soil with the flow of the washing medium, the polymer overtakes the metal ions which are retarded in their rate of elution through the soil by ionic attraction for soil particles. The metal ions in such instances may be viewed as chromatographing through the soil. As the two chemical materials come into contact at a subsurface zone, they interact to produce a water impermeable coagulum in situ. Dose rates of the metal ion and polymer will vary in proportion to the extent of treatment desired and somewhat in proportion to the chemical composition of the soil and its porosity. For most applications, the metal ion will be dosed at a rate from about 2 to about 200 grams per square yard and the polymer about 1 to about 100 grams per square yard. It may be noted that 1 gram per square yard is the equivalent of approximately 10 pounds per acre.

To facilitate elution of the applied chemicals to a desired subsurface level, it will be necessary to apply a washing medium. If desired, applicating solutions of the chemicals may be made up in the washing medium. Alternatively, the chemicals may be sequentially dusted on the surface of the soil and washed individually into the soil as by flooding the surface of the soil with irrigation water or allowing water from natural sources such as rain to wash the chemicals individually into the soil. In any event, application of the polymer will follow introduction of the metal ion only after sufficient water has washed the soil to carry metal ions to the proximate depth at which water impermeabilization is desired.

The above invention will be better understood by reference to the following examples.

EXAMPLE 1

A glass pipe 1½ inches in diameter, supported vertically, was packed to a depth of 6 inches with common dirt over a suitable water pervious support. A head of water 37 inches high was introduced above the soil surface. This gave a flow rate through the soil of 28 cc. per minute. A dilute aqueous solution containing sufficient ferric chloride to introduce the equivalent of 15 grams per square yard of soil surface was introduced into the column and allowed to perculate through the soil. Approximately 200 cc. of additional wash water was then flowed through the soil. A dilute aqueous solution of a 35 percent partially hydrolyzed polyacrylamide of at least about one million molecular weight was introduced into the column in amount sufficient to provide an equivalent of 3 grams per square yard of surface treated.

Within about 40 minutes after introduction of the polymer solution, the flow rate through the soil gradually decreased to about 2 cc. per minute. After 5 days under a maintained head of 37 inches of wash water, the flow rate was further reduced to 0.2 cc. per minute.

While under a head of water, the top one inch of soil was removed by a suction tube. The flow rate remained the same. Incremental soil removals were thus repeated three times until a total of 3 inches of soil had been removed. At this point the flow rate was 0.3 cc. per minute. When the fourth 1 inch increment of soil was removed and only 2 inches of soil remained of the original bed, the flow rate jumped to 120 cc. per minute. From the foregoing data it appears the water impermeable layer had been formed 4 inches below the surface of the soil.

EXAMPLE 2

In the following operations, soil impermeabilization is accomplished with solid water-insoluble, emulsion polymer particles sufficiently small flow through the soil. The procedure employed in this evaluation involved packing 24 inches of a clay containing river sand into each of 8 vertically disposed four foot lengths of ½ inch inside diameter glass tubing.

Initially the average flow rate of tap water through each column was determined by filling the tube section above the sand bed with water and measuring the water level after 1½ hours. The tubes were then refilled to the top to provide a two foot water head and to each was added a small amount of aqueous $FeCl_3$. Thereafter each tube was drained, refilled and again drained to the soil surface. The tubes were then filled with water and each, except for number 7, was dosed with a small amount of an unstabilized latex and ferric chloride. Number 7 was dosed with only latex. Details of the particular treatments employed and the results thereof on the flow rates through the soil beds are reported in the following table.

for the purposes of the instant invention by incorporating a small amount of alum insufficient to coagulate but sufficient to render the latex amenable to coagulation on

TABLE I

| | Run number | | | | | | | | | | | | | |
|---|---|---|---|---|---|---|---|---|---|---|---|---|---|---|
| | 1 | | 2 | | 3 | | 4 | | 5 | | 6 | | 7 | |
| | Dose [2] (gm.) | Flow rate, in./hr. | Dose (gm.) | Flow rate, in./hr. | Dose (gm.) | Flow rate, in./hr. | Dose (gm.) | Flow rate, in./hr. | Dose (gm.) | Flow rate, in./hr. | Dose (gm.) | Flow rate, in./hr. | Dose (gm.) | Flow rate, in./hr. |
| Water, initial flow | | 7.7 | | 8.6 | | 6.7 | | 6.7 | | 8.1 | | 7.5 | | 7.9 |
| Treatment: | | | | | | | | | | | | | | |
| FeCl₃ | .01 | | .01 | | .02 | | .02 | | .01 | | .02 | | None | |
| Latex (unstabilized) [1] | .05 | | .05 | | .05 | | .05 | | .05 | | .05 | | .05 | |
| Water, final flow after treatment | | 2.6 | | 5.5 | | 0.13 | | 0.13 | | 0.9 | | 0.22 | | 7.3 |

[1] This latex was a film forming 60/40 styrene-butadiene copolymer latex in the form of a 48% solid dispersion in water.
[2] Each 0.01 gram is the approximate equivalent of 660 pounds per acre.

From the above tabulated results, it is apparent that the salt-polymer combination is highly effective in reducing seepage. In runs 3, 4, 5 and 6, impermeable polymer layers about 1/32 to 1/16 inch thick were clearly visible at depths from 1/2 to 2½ inches below the soil surface.

In addition to the ferric ions employed above, similar results are achieved by the employment of other divalent or trivalent metal ions such as calcium, magnesium, and aluminum provided in the form of water-soluble salts of the strong mineral acids such as hydrochloric, sulfuric and nitric acids.

As previously indicated, the useful polymers are characterized essentially as water dispersible, anionic or nonionic, materials. The useful water-soluble polymers are the anionic and nonionic homo and copolymers of arcylamide, methacrylamide, acrylic and methacrylic acids. Also useful are sodium styrene maleate copolymers, polystyrene sulfonates, polyoxyalkylene oxides (e.g., polyethylene oxide), polyvinyl oxazolidinone, polyvinyl pyrrolidinone, and polyvinyl alcohol. In addition various polysaccharides such as carboxymethyl cellulose, hydroxyethyl carboxymethyl cellulose, carboxymethyl starch, and hydroxyethyl cellulose can be substituted for the above water-soluble polymers to achieve essentially comparable reduced permeability to water.

Water dispersible latex polymers, which are not water-soluble but because of their small particle size are uniformly dispersible in water, include the various latexes of homo and copolymers of vinyl acetate, methyl or ethyl methacrylate, methyl and ethyl acrylate, butadiene, acrylonitrile, styrene and vinyl toluene. These polymers can be substituted for the latex employed above. Preferably, latexes are of the unstabilized variety in that dispersing agents and/or other chemical reagents to maintain the latex particles in suspension have not been added. If the latexes are of the stabilized variety, they can be utilized in the invention if partially destabilized by the incorporation of metal ions or polymers to counteract the ionic charges of the dispersions. For instance, a latex stabilized with an anionic dispersant may be sufficiently destabilized contact with further amounts of oppositely charged ionic species. The essential requisite in all instances is a polymer particle, which either dissolves in water or is small enough in size as to flow through the soil to be treated. Although not critical, preferred practice is to use latex polymers having a particle size less than about 30 microns.

What is claimed is:

1. A method for treating soil which comprises incorporating into the soil an aqueous solution of a di- or trivalent metal ion, eluting said metal ion to a subsurface level by washing with water and thereafter washing into the soil a water dispersible anionic or nonionic polymer.

2. A method as in claim 1 wherein the polymer is an anionic or nonionic water-soluble polymer.

3. A method as in claim 1 wherein the polymer is in the form of a latex in aqueous suspension.

4. A method as in claim 3 wherein the particle size of the polymer is less than about 30 microns.

5. A method as in claim 1 wherein the metal ion is ferric ion and the polymer is an anionic acrylamide polymer.

6. A method as in claim 1 wherein the metal ion is ferric ion and the polymer is a styrene-butadiene latex.

7. A method as in claim 1 wherein the soil is a clayey soil having ion exchange properties for polyvalent metals and the metal ions are trivalent ferric or alumnium.

References Cited

UNITED STATES PATENTS

| 2,121,036 | 6/1938 | Irons | 166—294 |
| 2,190,003 | 2/1940 | Van Hulst | 61—36 |
| 2,842,338 | 7/1958 | Davis et al. | 166—295 |
| 3,123,158 | 3/1964 | Gallus | 166—295 X |
| 3,251,414 | 5/1966 | Willman | 166—295 |
| 3,378,070 | 4/1968 | Wessler et al. | 166—294 X |

STEPHEN J. NOVOSAD, Primary Examiner

U.S. Cl. X.R.

61—35